Dec. 21, 1926.

A. S. KNOWLTON 1,611,646

APPARATUS FOR PRODUCING COMPOUND RUBBER SHEETS

Filed Jan. 28, 1926   2 Sheets-Sheet 1

Inventor:
Arthur S. Knowlton,
by Spear Middleton Donaldson & Hall
Attys.

Dec. 21, 1926.                                              1,611,646
                       A. S. KNOWLTON
            APPARATUS FOR PRODUCING COMPOUND RUBBER SHEETS
                      Filed Jan. 28, 1926          2 Sheets-Sheet 2
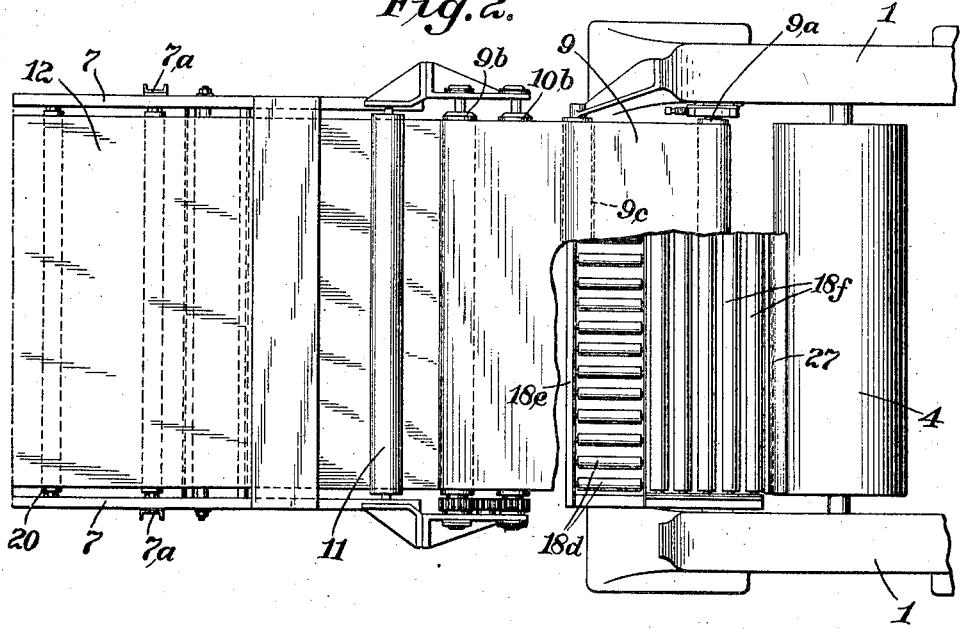
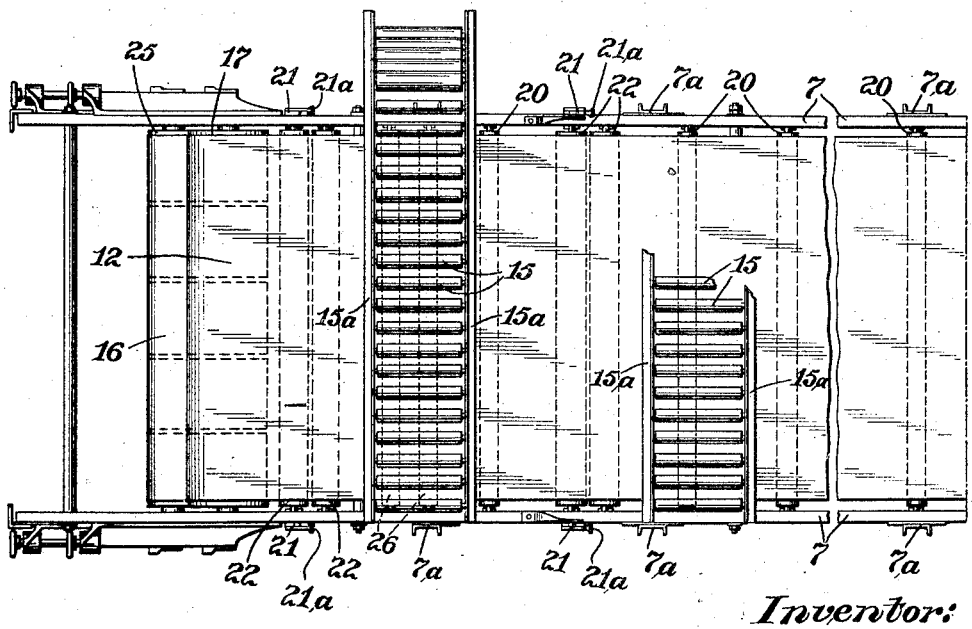
Inventor:
Arthur S. Knowlton,
by Spurr Middleton Donaldson & Hall
                                    Attys.

Patented Dec. 21, 1926.

1,611,646

UNITED STATES PATENT OFFICE.

ARTHUR S. KNOWLTON, OF AKRON, OHIO, ASSIGNOR TO THE MILLER RUBBER COMPANY, OF AKRON, OHIO, A CORPORATION OF OHIO.

APPARATUS FOR PRODUCING COMPOUND RUBBER SHEETS.

Application filed January 28, 1926. Serial No. 84,396.

My present invention relates to improvements in apparatus for producing compound rubber sheets, that is, a sheet which is composed of a plurality of thin sheets of rubber homogeneously united into a single sheet.

The invention aims to provide simple and efficient means whereby the thin tacky sheets may be continuously produced, united and rolled up on stock drums, without danger of wrinkling or damaging the sheets.

The invention further aims to provide apparatus of this character whereby compound sheets of any desired thickness may be readily produced at the will of the operator.

Another object is to provide apparatus having in combination with means for continuously producing a compound sheet, a plurality of stock drums on which the stock sheet may be selectively wound, one drum being capable of being readily removed when loaded while another is having the sheet wound thereon.

With these and other objects in view, which will hereinafter appear, the invention includes the novel features of construction and arrangement and combination of elements hereinafter described, the nature and scope of the invention being ascertained and defined by the claims appended hereto.

What I at present consider the preferred embodiment of my invention is illustrated in the accompanying drawings, in which:—

Figure 1:
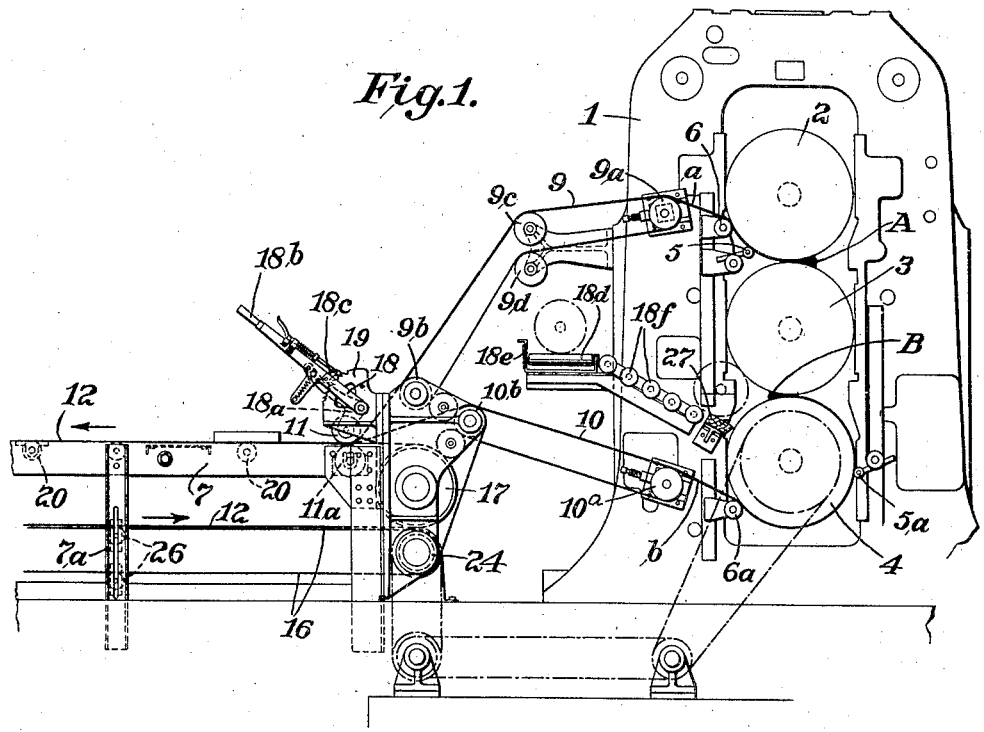
Figure 1A:
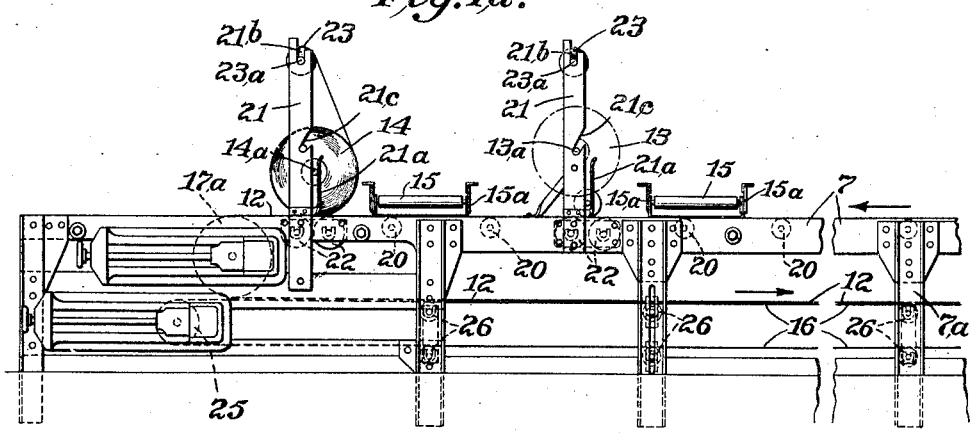

Figure 1 is a side elevation of the right half of the apparatus or machine.

Fig. 1ª is a similar view of the other half of the same.

Fig. 2 is a plan view of Fig. 1, partly broken away, and

Fig. 2ª is a similar view of Fig. 1ª.

Referring by reference characters to this drawing, the numeral 1 designates the frame of a rubber calender, which may be of the ordinary or any desired construction having a plurality of rolls disposed one above the other for producing a plurality of plies of rubber stock. In the present instance the calender is provided with three rolls 2, 3 and 4 respectively.

A bank of rubber stock A is fed into the bight of the rolls 2 and 3 on the right hand side, Fig. 1, to produce a ply $a$, while a similar bank of stock B is fed to the bight of the rolls 3 and 4 from the opposite side to produce a ply $b$. These plies may be trimmed to the desired width and to produce smooth edges by trimming knives 5 and 5ª of the usual or any desired construction. The ply $b$ passes around the bottom of the roll 4 so that both plies are delivered to one and the same side of the calender, where they pass over the idle guide rolls 6 and 6ª.

Located closely adjacent these rolls 6 and 6ª are the respective ends of endless belt conveyors 9 and 10 which have their opposite ends juxtaposed and located above the feed end of a horizontal endless belt conveyor 12 carried by a suitable frame work comprising as shown horizontal members 7 supported by legs or standards 7ª. The belt 12 passes at the feed end around a guide roll 17 journaled to rotate about a fixed axis while at the opposite end it passes around a guide roller 17ª mounted in slidable bearings for applying suitable tension to the belt. Belt conveyors 9, 10 and 12 are all driven to have the same surface speed as the calender rolls. The belt conveyors 9 and 10 at the ends adjacent the rolls 2 and 4 pass around guide rollers 9ª and 10ª which are mounted in slidable bearings for properly tensioning the conveyors, while at their opposite ends they pass around the drive rolls 9ᵇ and 10ᵇ respectively, which roll, together with roll 17, is preferably driven from the calender by means such as the belt and gear connections shown.

Due to the fact that the rolls 9ª and 10ª are located closely adjacent the corresponding calender rolls, the plies are unsupported for only a very short distance in passing from the calender rolls to the belt conveyors and as the belts are driven at the same speed as the calender no stretch is imparted to the plies and there is no chance for it to sag or get out of shape.

The upper and lower flights of the belt 9 pass over idle guide rollers 9ᶜ and 9ᵈ which are positioned so as to deflect the flights from a straight line whereby additional space is provided for supplying the bank of rubber to the bight of rolls 3 and 4.

Rolls 9ᵇ and 10ᵇ are located above the feed end of belt 12 and the plies are led from the belts 9 and 10, where they pass around these rolls, to the surface of conveyor 12 and pass with it beneath a pair of presser rolls 11 and 11ª, the latter being mounted in fixed bearings while the former is adjustable towards and from the latter to vary the pressure or to accommodate varying thicknesses of stock. A convenient manner of mounting roll 11 is to journal it in the arms 18ª of bell crank levers 18 fulcrumed on fixed pivots, the other arms being extended to form handles 18ᵇ and provided with hand operated pawls 18ᶜ engaging ratchet quadrants 19 for holding the levers in proper position.

The pressure of roll 11 causes the plies to be united into a compound sheet. Rolls 11 and 11ª are idle rolls driven by the passage of the belt 12 and plies therebetween.

Preferably roller 11 is cloth faced.

The upper flight of conveyor belt 12 is supported at suitable intervals intermediate its ends by idle rollers 20.

At points suitably and successively remote from the feed end of conveyor 12 are located standards 21 for the stock drums 13 and 14 which are in the shape of floating rollers adapted to press by gravity on the compound sheet, the belt being supported beneath each drum by a pair of rollers 22, the space between which is in vertical alinement with the axis of the corresponding stock drum. The stock drums may be floatingly supported or guided by any suitable means enabling their ready removal, which may comprise vertical guide channels open at their upper ends and adapted to receive shaft or stub axle projections 13ª and 14ª on the ends of the rolls. Such guide channels may be formed by bracket irons 21ª secured to the standards and having arms extending upward for a suitable distance parallel thereto. A stock drum being thus held in floating position and resting on the compound sheet, which has been severed at this point, the feed of the belt and compound sheet causes the latter to be wound up on the drum. As the sheet is sticky, means is provided for feeding a liner to be interwound with the sheet, such means taking the form of a liner drum 23 having stub axles or shaft projections 23ª resting in bearing slots 21ᵇ in the upper ends of the standards, such slots being open at their upper ends whereby the liner rolls may be readily removed when empty and replaced by fresh rolls.

The standards 21 are further provided with open slots 21ᶜ designed to receive the shaft projections of the stock drums whereby one stock drum may be held in elevated position, as shown at 13, Fig. 1, while the other is in winding position as shown at 14.

After stock drum 14 has had a sufficient quantity of the compound sheet wound thereon, the drum 13 is lowered onto the sheet and proceeds to wind, and while in operation drum 14 may be removed and replaced by a fresh drum.

As these drums are large and heavy, I provide means for readily handling them without danger of their contacting with the traveling stock sheet, which means preferably comprises a series of idle rollers 15 journaled in frame bars 15ª extending transversely of and above the conveyor 12.

In order to adapt the apparatus for compounding thicker sheets, I provide the following mechanism supplementing that above described and cooperating therewith.

This comprises an endless conveyor belt 16 passing around a driven roll 24 beneath roll 17 and around a tension roll 25 and having its upper flight juxtaposed to the lower flight of conveyor 12, the intermediate portions of the flights being supported by idle rolls 26. When thicker stock is desired, both stock drums 13 and 14 are held elevated and the sheet formed of two plies is allowed to pass with the belt down around roll 17ª and between the lower flight of conveyor 12 and the upper flight of belt 16, until the roller 17 is reached, when the sheet passes beneath the delivery ends of conveyors 10 and 9 and has superposed thereon another pair of plies which are pressed thereon and together by the action of rolls 11 and 11ª.

This passing and repassing may be repeated until a compound sheet of the desired thickness is reached, when the sheet is severed and wound up on one of the stock rolls in the manner above described.

It will be understood that the belts are made of such length that the multi-ply sheet formed as last described is of the length to fill a single stock roll.

As the space defined by the conveyors 9 and 10 and the calender rolls is relatively somewhat limited and the banks of rubber are bulky and heavy, I provide means for supplying said banks or batches to the bight of rolls 3 and 4 which may take the form of closely associated idle rollers 18ᵈ journaled in a horizontal frame 18ᵉ and inclined rollers 18ᶠ leading towards the roll 4, the supporting frame including a shelf-like member 27 adjacent roll 4.

Having thus described my invention, what I claim is:

1. Apparatus for producing compound rubber sheets comprising a calender having upper and lower rolls for producing a plurality of sheets of rubber stock, endless belt conveyors having their receiving ends juxtaposed to said calender rolls to receive the formed sheets therefrom, said conveyors having juxtaposed delivery ends, and continuously acting means for pressing the sheets together as they leave the juxtaposed ends of the conveyors.

2. Apparatus for producing compound rubber sheets comprising a calender having upper and lower rolls for producing a plurality of sheets of rubber stock, endless belt conveyors having their receiving ends juxtaposed to said calender rolls to receive the formed sheets therefrom, said conveyors having juxtaposed delivery ends, an endless conveyor belt to receive the sheets in superposed relation, and a pair of opposed presser rolls located above and below said endless conveyor belt.

3. Apparatus for producing compound rubber sheets comprising a calender having upper and lower rolls for producing a plurality of sheets of rubber stock, endless belt conveyors having their receiving ends juxtaposed to said calender rolls to receive the formed sheets therefrom, said conveyors having juxtaposed delivery ends, an endless belt conveyor arranged to receive the sheets in superposed relation from the aforesaid conveyors, a pressure resisting roll located beneath the upper flight of the last named conveyor belt, and an adjustable pressure roll above said belt for pressing the sheets together.

4. Apparatus for producing compound rubber sheets comprising a calender having upper and lower rolls for producing a plurality of sheets of rubber stock, endless belt conveyors having their receiving ends juxtaposed to said calender rolls to receive the formed sheets therefrom, said conveyors having juxtaposed delivery ends, an endless belt conveyor arranged to receive the sheets in superposed relation from the aforesaid conveyors, a pressure resisting roll located beneath the upper flight of the last named conveyor belt, and an adjustable pressure roll above said belt for pressing the sheets together, and means for driving all of said belts at the same speed as the calender rolls.

5. Apparatus for producing compound rubber sheets comprising a three high roll calender, a pair of endless belt conveyors, one having an end adjacent the breast of the topmost roll and the other an end adjacent the breast of the lower roll, said belts having their lower ends juxtaposed, a third endless belt having an end adjacent the juxtaposed ends of said first mentioned belts to receive the sheets therefrom in superposed relation, means for driving all of said belts in unison with each other and the calender and opposed presser rollers located on opposite sides of the upper flight of said third belt.

6. Apparatus of the class described comprising a calender for producing a plurality of plies of rubber stock, a horizontally disposed endless belt conveyor driven at the same speed as the calender rolls, means for guiding the plies from the calender rolls and delivering them in superposed relation onto the surface of the upper flight of the conveyor, presser rolls cooperating with said upper flight to join said plies together, and means for causing the joined plies to travel with the lower flight of the conveyor to be repassed through the presser rolls to have additional plies superposed and pressed thereon.

7. Apparatus of the class described comprising a calender for producing a plurality of plies of rubber stock, a horizontally disposed endless belt conveyor driven at the same speed as the calender rolls, means for guiding the plies from the calender rolls and delivering them in superposed relation onto the surface of the upper flight of the conveyor, presser rolls cooperating with said upper flight to join said plies together, and a second endless belt conveyor arranged below said first named conveyor with its upper flight juxtaposed to the lower flight thereof.

8. Apparatus of the class described comprising a calender having superposed rolls for forming a plurality of plies of rubber stock, converging conveyor means for conducting said sheets from the calender, means for uniting said plies as they leave said conveyor means, and conveyor means leading into the space defined by said calender and converging conveyor means for feeding banks of rubber to the calender.

In testimony whereof, I affix my signature.

ARTHUR S. KNOWLTON.